(No Model.)

W. WILKINSON.
TRACTION ENGINE.

No. 280,428. Patented July 3, 1883.

Witnesses:
Levi Bacon
A. C. Huntemann

Inventor.
WILLIAM WILKINSON,
By his Attorney
Jas. L. Ewin.

N. PETERS, Photo-Lithographer, Washington, D. C.

UNITED STATES PATENT OFFICE.

WILLIAM WILKINSON, OF WIGAN, COUNTY OF LANCASTER, ENGLAND.

TRACTION-ENGINE.

SPECIFICATION forming part of Letters Patent No. 280,428, dated July 3, 1883.

Application filed March 2, 1883. (No model.)

*To all whom it may concern:*

Be it known that I, WILLIAM WILKINSON, a subject of her Britannic Majesty, residing at Wigan, in the county of Lancaster, England, have invented a new and useful Improvement in Geared Driving Apparatus for Road, Tram, or Traction Engines, of which the following is a specification.

My invention relates to improvements in geared driving apparatus for road, tram, or traction locomotives, in combination with one or more vertical-cylinder engines, whereby the galloping action produced by direct driving onto the cranked bearing or driving axles is avoided, and at the same time the gearing is so arranged and constructed as to allow the greatest freedom of movement or side canting to the bearing axle and wheels. I attain these objects by the following mechanism, illustrated in the accompanying drawings, in which—

Figure 1:
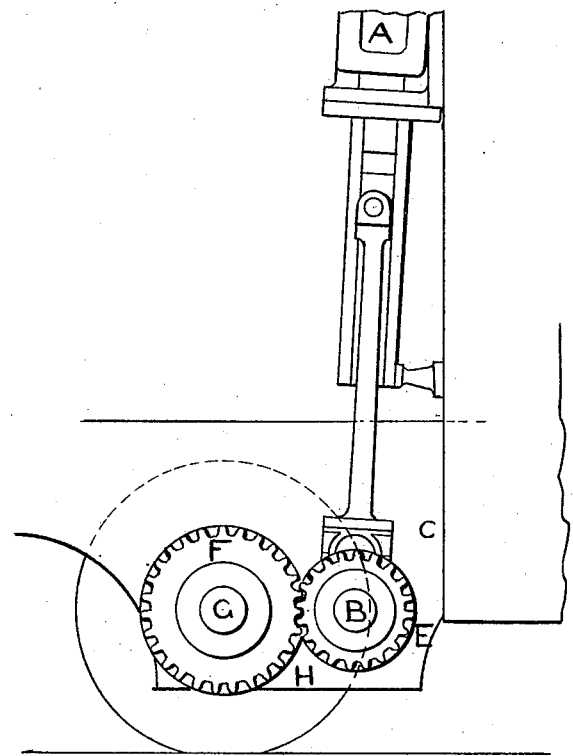
Figure 3:
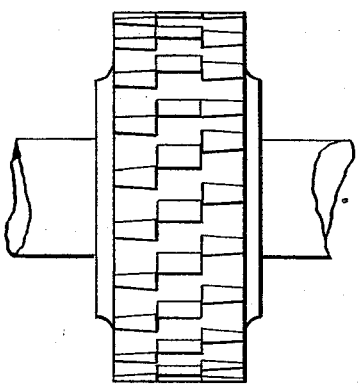
Figure 2:
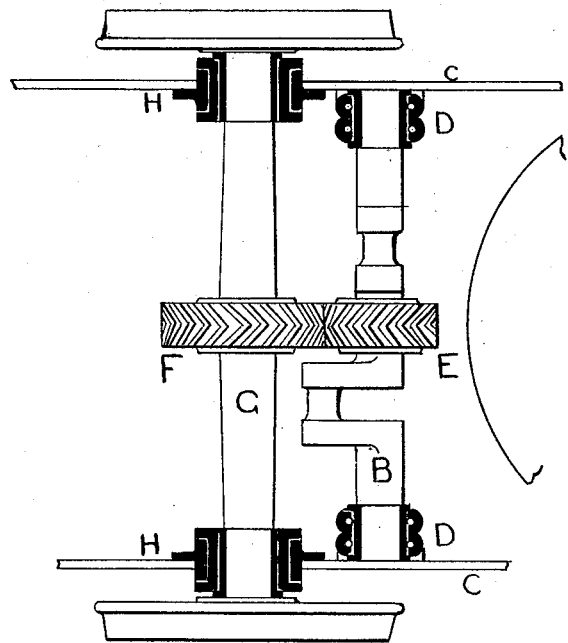
Figure 4:
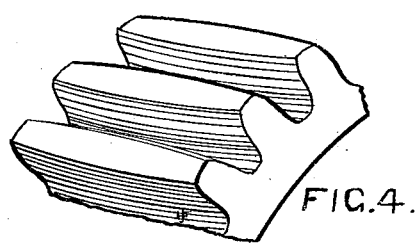

Figure 1 is an elevation of my driving-gear as applied to a tram-locomotive. Fig. 2 is a plan of the same. Fig. 3 is a detail of alternative-stepped gearing. Fig. 4 shows transverse radial curvature of the teeth.

Similar letters refer to like parts throughout the several views.

The vertical cylinder or cylinders A (preferably two) are connected in the usual way to a cranked driving-shaft, B, the cranks being preferably at right angles to each other. This crank-shaft B is supported in the frames C by fixed bearings and caps D, of any suitable design, and carries at its center a toothed wheel, E, which gears with a similar wheel, F, at the center of the axle G, of the bearing and driving wheels. These geared wheels E and F may be plain cogged wheels, or with double diagonal teeth, or stepped, as shown in alternative in Fig. 3. They are preferably of cast-steel, and the essential novelty in their construction is that the bearing-surfaces of the teeth are rounded, as shown in Fig. 4, as considered longitudinally with the axis, so that they bear chiefly at the center of the tooth and allow the bearing-axle G perfect freedom of side cant, if one wheel is lifted more than the other. The bearing-wheel axle G is carried in the ordinary axle-boxes, sliding in hound-plates H, the locomotive being hung by springs on the said axle-boxes, so that the wheel-axle has perfect freedom of movement under small jolts. It is only by placing the driving cog-gear E F at the center of oscillation, and by the curving of the usually flat tooth, that freedom of movement under a side cant can be given to the wheel-axle without a tendency to break the gearing.

I am aware that gearing has been used for road-locomotives or traction-engines in various ways, and that diagonally toothed and stepped gearing in itself is not novel.

I am also aware that in certain traction-engines in which the driven axle is mounted in a swiveled truck, gearing for transmitting motion to said axle has been "rounded" so as to render the periphery of the axle-gear concentric or approximately concentric with the king-bolt of the truck, and the driving-pinion of corresponding shape, for the purpose of permitting the swiveling motion of the truck. I do not claim gearing for traction-engines so rounded; and my present invention is not applicable to traction-engines in which the driven axle is so located in a swivel-truck. The object of the peculiarly-constructed gearing which is the basis of my claims is, as hereinbefore set forth, to adapt the engine-frame to ride upon springs and to rise and fall freely without the use of loose gearing. Other means for accomplishing this result have been proposed by others. Such means other than those hereinbefore specified are hereby disclaimed, as outside of my invention; but What I do consider novel, and desire to secure by Letters Patent, is—

1. In a traction-engine having the axle of its driving-wheels mounted in vertically-sliding boxes, the combination, with said axle, of a driving-shaft mounted in fixed bearings, in the same or substantially the same horizontal plane, and central transmitting-gearing connecting said shaft and axle, constructed with teeth decreasing in thickness from mid-width to the respective sides of each gear, as herein specified, for the purpose set forth.

2. The combination, in a traction-engine, of a vertical cylinder or cylinders, A, a crank-shaft, B, in fixed bearings D D, central transmitting-gearing, E F, constructed with "diagonal" teeth decreasing in thickness from mid-width to the respective sides of each gear, and an axle, G, in the same or substantially the same horizontal plane as said shaft, carrying the driving-wheels of the engine at its ends, and mounted in vertically-sliding boxes H H, as improved means for permitting the respective sides of the engine-frame to rise and fall upon interposed springs without looseness of gearing, as herein set forth.

Wigan, 9th February, 1883.

WILLIAM WILKINSON.

Witnesses:
    THOMAS EDWARD SWANN,
9 *Horsefield Street, Wigan, Solicitor's Clerk.*
    THOMAS BARROW,
*Greenough Street, Wigan, Solicitor's Clerk.*